United States Patent [11] 3,623,126

[72] Inventor George B. Newhouse
Long Beach, Calif.

[21] Appl. No. 860,598
[22] Filed Sept. 24, 1969
[45] Patented Nov. 23, 1971
[73] Assignee North American Rockwell Corporation

[54] EDGE SHARPENING IN A SCANNED IMAGE DISPLAY SYSTEM
6 Claims, 19 Drawing Figs.

[52] U.S. Cl. .... 178/7.5 R, 178/6.8
[51] Int. Cl. .... H04m 5/14
[50] Field of Search .... 178/6.8, 7.5 R, 7.1

[56] References Cited

UNITED STATES PATENTS

| | | | |
|---|---|---|---|
| 2,678,389 | 5/1954 | Loughlin | 328/164 |
| 3,010,024 | 11/1961 | Barnett et al. | 178/6.8 |
| 3,188,386 | 6/1965 | Byatt | 178/6.8 |
| 3,366,735 | 1/1968 | Hecker | 178/6.8 |
| 3,422,223 | 1/1969 | Scipione | 178/69.5 G |

*Primary Examiner*—Robert L. Griffin
*Assistant Examiner*—Donald E. Stout
*Attorneys*—L. Lee Humphries, H. Fredrick Hamann and Rolf M. Pitts

ABSTRACT: An interlaced raster scan that scans alternately in each of two preselected mutually orthogonal directions, utilizing signal spike forming circuitry responsive to changes in the raster scan video display signal. More nearly equal image edge sharpening is provided for all edges of the display, regardless of the orientation of the image edge.

INVENTOR.
GEORGE B. NEWHOUSE
BY
ATTORNEY

INVENTOR.
GEORGE B. NEWHOUSE

BY Ralph Pitts

ATTORNEY

INVENTOR.
GEORGE B. NEWHOUSE

BY [signature]

ATTORNEY

INVENTOR.
GEORGE B. NEWHOUSE

BY Roger Pitts

ATTORNEY

INVENTOR.
GEORGE B. NEWHOUSE

BY Roy M Pitts

ATTORNEY

INVENTOR.
GEORGE B. NEWHOUSE

BY [signature]

ATTORNEY

INVENTOR.
GEORGE B. NEWHOUSE

BY

ATTORNEY

INVENTOR.
GEORGE B. NEWHOUSE

BY [signature]

ATTORNEY

INVENTOR.
GEORGE B. NEWHOUSE

BY Roger M. Pitts

ATTORNEY

INVENTOR.
GEORGE B. NEWHOUSE
BY Roger Pitts
ATTORNEY

INVENTOR.
GEORGE B. NEWHOUSE
BY Roger Pitts
ATTORNEY

EDGE SHARPENING IN A SCANNED IMAGE DISPLAY SYSTEM

BACKGROUND OF THE INVENTION

This invention pertains to the field of video image sharpening and more particularly to video image sharpening utilizing mutually orthogonal and interlaced scans.

It has been determined and verified by human factors experiments that image enhancement by various edge-sharpening techniques applied to the video signal increases the probability that an observer will detect and recognize an object of significance during a reconnaissance or military strike mission. In a normal cathode-ray tube television-type image presentation, the raster scan will scan the image field with substantially parallel horizontal lines that sweep the field, generally from top to bottom, in a uniform manner. This form of standard raster scan will enhance, or make more easily discernable, image edges that are perpendicular to the direction of raster scan, while having little or no effect upon image edges parallel to the raster scan direction. In other words, the degree of enhancement is a function of the degree of perpendicularity of the image edges to the raster scan.

An early solution to the problem of nonuniform edge enhancement for image edges of all orientations to the raster scan is presented in U.S. Pat. No. 3,188,386 entitled Television Scanning Systems by D. W. G. Byatt, granted June 8, 1965. Byatt's device, as described at column 1, line 65 through column 2, line 18 of his patent, comprises two line deflection systems for deflecting a scanning electron beam in two mutually perpendicular directions, two field deflection systems for deflecting the electron beam in the same mutually perpendicular directions and associated time base and switching systems. Byatt sweeps his raster scan in a horizontal direction then rotates the scan 90° for perpendicular sweeps. Although Byatt was able to equalize the image enhancement of all edges regardless of orientation to the raster scan, an overall degradation of edge sharpening resulted.

Byatt's system, by accomplishing substantially equal image edge compensation regardless of image edge orientation, is intended to provide a more desirable picture for television entertainment viewing since an overall softness is imparted to the image edges. Such an image presentation may, however, be highly undesirable in a system which is intended for resolution of objects, such as in a scanning radar system. In military or surveillance-type applications, for instance, the ability to distinguish certain objects from a background of many detected objects will depend on the definition given the edges of these objects, which definition tends to be reduced by the above-noted prior art approach to image compensation.

A prior art solution to the general problem of edge sharpening in a scanned image display system is to incorporate spike forming circuitry into the scan. This may be accomplished by a second derivative subtraction to the original video signal which is an analog of brightness change taking place perpendicular to the raster scan. Using spike forming circuitry, image edges with the most vertical extent are sharpened the most and the amount of sharpening gradually decreases as the edge varies from perpendicular to the raster scan to where no edge sharpening occurs for edges parallel to the raster scan. In such prior art arrangement, spike forming circuitry serves to enhance image edges perpendicular to the raster scan, while those image edges that are substantially parallel to the raster scan are not enhanced.

SUMMARY OF THE INVENTION

By means of the concept of the subject invention, more nearly equal edge-sharpening is provided for mutually perpendicular lines and image enhancement is provided for all edges regardless of orientation whereby the above-noted shortcomings of the prior art are avoided.

The present invention for a scanned image display system provides means for enhancing the edges of the displayed image in cooperation with means for scanning in at least two mutually angled directions. Image display means cooperates with signal spike forming circuitry responsive to a video signal source and with means for interlacing successive as well as alternate scans of the display system, whereby nearly equal image edge enhancement is obtained for all edges regardless of orientation.

It is therefore an object of this invention to provide for more nearly equal edge sharpening of a displayed image in an image display system.

It is a further object of this invention to provide for more nearly equal edge sharpening of a displayed image in an image display system that scans in at least two directions.

A still further object of this invention is to provide for more nearly equal edge sharpening of a displayed image in an image display system wherein scans of the display are interlaced.

Yet another object of this invention is to provide more nearly equal edge sharpening of a displayed image in cross-scanned image display system comprising spike forming circuitry responsive to changes in the video display signal.

It is another object of this invention to provide more nearly equal edge sharpening of a displayed image in an image display system incorporating both scan interlacing and signal spike forming circuitry responsive to changes in the video display signal.

These and other objects of the present invention will become apparent and better understood from the following description, taken in conjunction with the accompanying drawings, in which:

Figure 2:
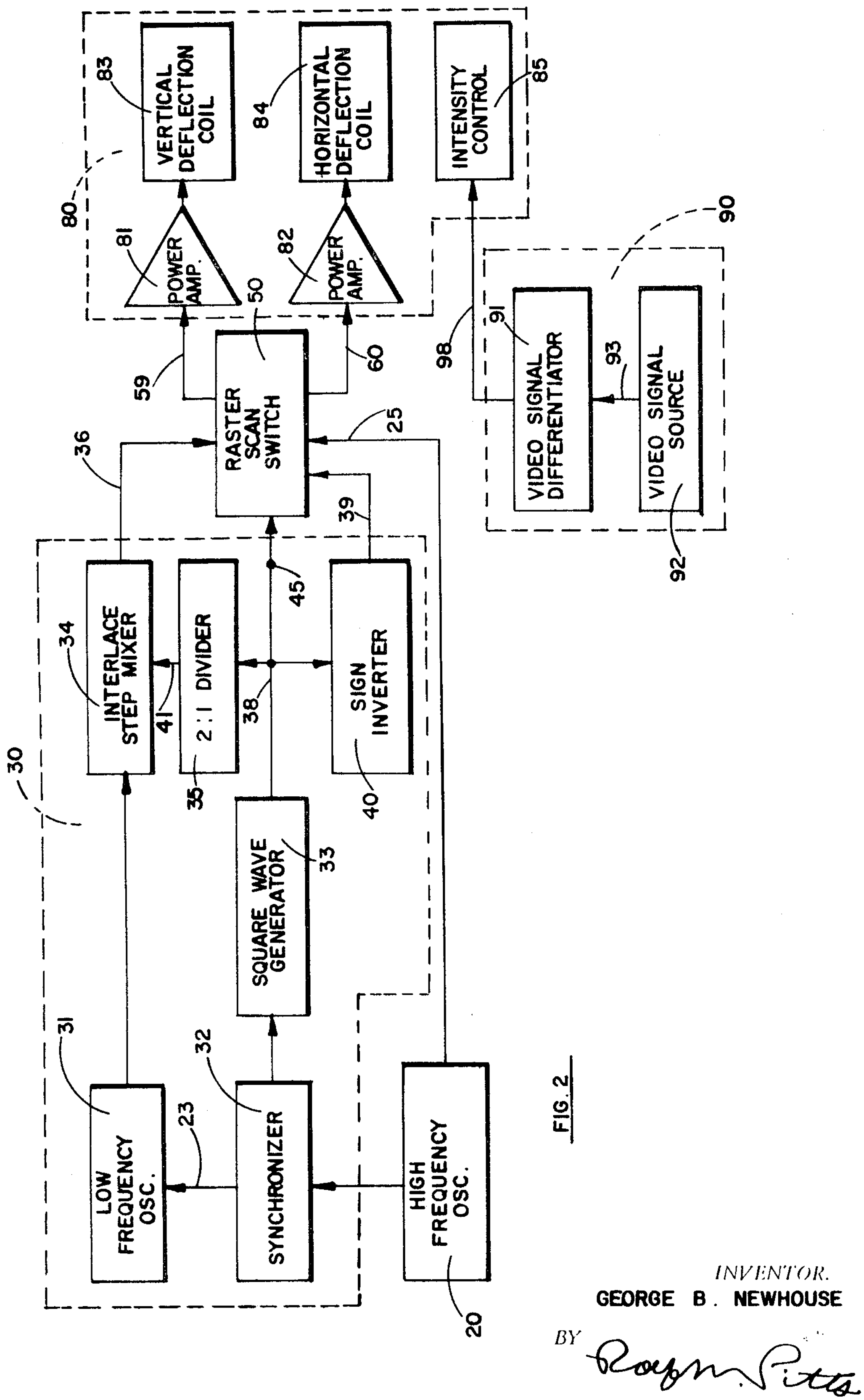
FIG. 2 is a specific embodiment of one aspect of the image display system of FIG. 1 in which scan directions are switched at the field rate.
Figure 3:
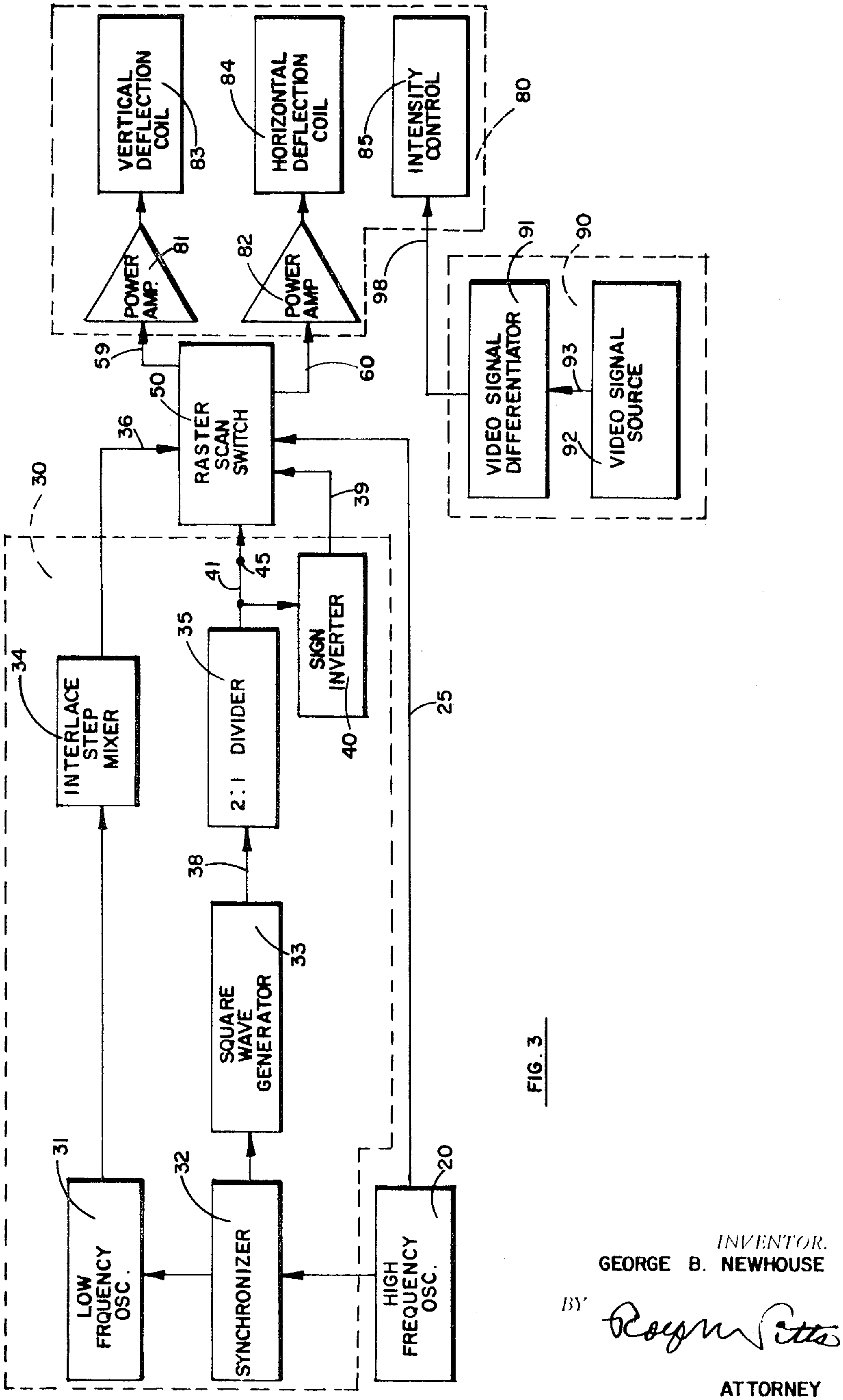
FIG. 3 is an alternate embodiment of the image display system of FIG. 1 and in which scan directions are switched at the frame rate.

FIGS. *6a–6g* are time history presentations of the interlaced image display system of FIG. 2 switched at the field rate;

FIG. *7a–7g* are time history presentations of the interlaced image display system of FIG. 3 switched at the frame rate.

DESCRIPTION OF THE PREFERRED EMBODIMENTS

Figure 1:
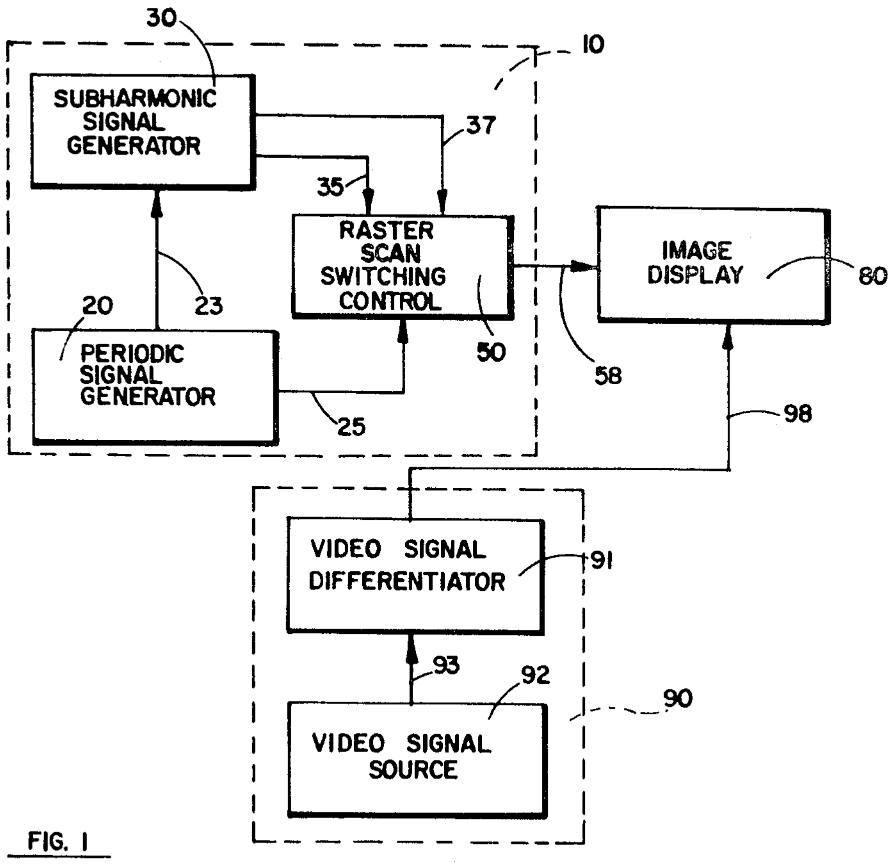
FIG. 1 is a block diagram of an image display system embodying the concept of the invention.

Referring to FIG. 1 there is shown a scanned image display system comprising means 90 for enhancing the edges of the displayed image and means 10 for scanning in at least two mutually angled directions, meaning first and second substantially mutually perpendicular directions. The image display 80 is responsively coupled to both the means 90 for enhancing the edges of the display image and the means 10 for scanning in at least two mutually angled directions such that nearly equal image edge enhancement is obtained for all edges regardless of edge orientation. The scanning pattern of a scanning beam in an associated television camera is, of course, similar to and synchronized with that of the image display system.

The means 10 for scanning in at least two mutually angled directions comprises a periodic signal generator 20 and a subharmonic signal generator 30 responsively coupled to an output of periodic signal generator 20 such that subharmonic signal generator 30 operates in synchronism with and at a subharmonic of the periodic signal generator output. Raster scan switching control 50 is responsively coupled to periodic signal generator 20 and subharmonic signal generator 30. Raster scan switching control 50, being responsively coupled to periodic signal generator 20 and subharmonic signal generator 30, provides switching control of the raster scan in alternative ones of mutually angled raster scan directions. Switching rate control signals for scan orientation and field rates, on lines 37 and 35 respectively, are fed to raster scan switching control 50 from subharmonic signal generator 30.

Means 90 for enhancing the edges of the display image is comprised of a video signal differentiator 91 responsively coupled to a video signal source 92 of a video signal to be displayed. Video signal differentiator 91 effects a second derivative subtraction to the original video signal and which is an analog of brightness change taking place perpendicular to the raster scan.

The cooperation of scanning means 10 and the means 90 for enhancing the edges of the display image provides nearly equal image edge enhancement for all edges regardless of edge orientation because the switching of the raster scan will correspondingly switch the orientation of image edges being enhanced by the analog of brightness change effected by the video signal differentiator 91.

Another aspect of the invention is to provide means for enhancing a display image in a scanned image display system where the raster scanning direction of the display system is switched at either the frame rate or the field rate.

Field rate, frame rate, raster scan rate and raster scan period as used herein need to be defined in order to fully appreciate the present invention.

Raster scan rate is the rate, usually expressed in lines per second, at which image lines are swept on a display screen. The duration of raster scanning in any given plane prior to switching the raster scan orientation to a different plane is a raster scan period. Any raster scan period comprises, of course, a plurality of raster scan sweeps.

A field is a single sweep of the image display without regard to the number of lines swept and thus field rate is the switching rate between distinct raster scan orientation wherein the scan traverses the image display screen only once. Every line of the image display in a given orientation need not be swept for a sweep to constitute a field. As an example, suppose a standard 525 line video image display is being utilized. A sweep from top to bottom of the odd number lines (or conversely, only the even numbered lines) constitutes one field. Similarly, if every line of the 525 lines were swept the field rate would be twice as long (for a given raster scan rate) as when every other line is swept. Once raster scan rate is fixed, field rate can only be varied by selecting the number of video lines to be scanned during each traversal of the image display. The definition of field rate is not affected by scan orientation or direction; that is to say, a single image sweep from left to right is a field the same as a single sweep from top to bottom is a field. The reciprocal of field rate is raster scan period in units of time.

The frame rate is the periodicity associated with sweeping all lines of a given orientation in a scanned image system. One frame consists of all the lines of the image display of a given orientation, and frame rate is simply the number of times per unit time interval that all the lines are swept. In a 525 line image display system where the field sweep is every other line, the field rate is twice the frame rate because two field sweep are required to sweep all the image display lines which constitute a frame.

A scanned image display system, such as described herein and having means for scanning in at least two mutually orthogonal directions, may switch scanning directions at either the frame or field rate. A field rate switching system is one in which the orientation of the raster scan is switched after each field sweep. A frame rate switching system is one in which the orientation of the raster scan is not switched until every line in the image has been swept which may be after two or more field sweeps. If the frame rate is equal to the field rate, then the field sweep is of every line of the image display system. FIGS. 6 and 7, to be discussed more fully later, illustrate the principles of field and frame rate switching.

A scan is said to be interlaced when successive field sweeps are of lines of the image display system between lines previously swept. For example, if the field sweep is of every other line, say the odd numbered lines, and the successive field sweep is of the even numbered lines, the two sweeps are said to be interlaced.

Turning to FIG. 2, there is shown a specific embodiment of one aspect of the scanned image display system of FIG. 1 and incorporating mutually angled interlaced scans switched at the field rate. There is provided a periodic signal generator 20, subharmonic signal generator 30, raster scan switching control 50, image enhancing means 90 and image display 80, corresponding to like referenced elements of FIG. 1. However, in the field rate switching embodiment of FIG. 2, subharmonic signal generator 30 comprises a synchronizer 32, a low frequency oscillator 31, an interlace step mixer 34, a square wave generator 33, a 2:1 frequency divider and a sign inverter 40, while a high-frequency oscillator is employed as the periodic signal generator 20. The construction and arrangement of synchronizer 32 and interlace mixer 34 are well understood to those skilled in the art, a type of synchronizer and interlace mixer being described in U.S. Pat. No. 3,422,233 to Scipione.

Image display means 80 is further comprised of power amplifiers 81 and 82, vertical deflection coil 83, horizontal deflection coil 84 and intensity control 85. In normal operation of the above-described arrangement, high-frequency oscillator 20 determines the raster scan rate and drives synchronizer 32 and raster scan switch control 50. Raster scan switch control 50 functions as a controllable double-pole, double-throw switch for alternately switching the respective outputs of interlace step mixer 34 and high-frequency oscillator 20 between mutually exclusive scanning means incorporated in the image display 80 for scanning in two mutually exclusive directions.

Low frequency oscillator 31 is responsive coupled to synchronizer 32 and caused to operate at a subharmonic of the high-frequency oscillator 20 for providing the field rate of the image display system at which the interlace step mixer 34 is driven. As is clearly understood, mixer 34 is merely a biased signalling means for periodically biasing a selected one of deflection coils 83 and 84, in response to the periodic inputs thereto. The square wave generator 33 is responsively coupled to the synchronizer 32 for providing clock pulses at the field rate to raster scan switch control 50. Of course, clock pulses from sources other than a square wave generator, such as a digital controller or a symmetrical wave shape generator, may also be used. The output on line 38 is also processed by a 2:1 frequency divider 35 to provide a frame rate signal for use by the interlace step mixer 34. The field rate when using the 2:1 divider of FIG. 2 is two times the frame rate although the dividers other than 2:1 may be used where a field rate and frame rate relationship other than 2:1 is desired.

Raster scan switch control 50 may be coupled to output line 38 of generator 33 and output line 39 of sign inverter 40 for simplification in the design of the raster scan control logic, to be described more fully hereinafter. The need for sign inverter 40 may be easily eliminated by changing the logic design of the raster scan switch control 50 or the square wave generator 33.

In an application where the field rate is twice the frame rate, such as where interlace of every other line in the frame is desired, the switching of interlace step mixer 34 at the frame rate will cause a step shift of one line width in the next two field rate sweeps (one horizontal and one vertical) which will achieve interlace. The interlace signal appears as a small voltage superimposed on the output signal of interlace step mixer 34, which is fed by raster scan switch control 50 to an appropriate one of display means 80. In response to the square wave signal inputs from generator 33 and sign inverter 40, raster scan switch control 50 alternately electronically couples the outputs of high-frequency oscillator 20 and interlace step mixer 34 to mutually exclusive ones of beam deflection coils 83 and 84 respectively (through power amplifiers 81 and 82) to provide mutually orthogonal raster scans. In other words, when the scan is in the horizontal direction, the raster line frequency output of high-frequency oscillator 20 will be coupled to the horizontal deflection coil 84 while the low frequency field rate signal from interlace step mixer 34 is coupled to vertical deflection coil 83; when the scan is completed in the horizontal direction, clock pulses from the square wave generator 33 will initiate actuation of the raster scan switch control 50 to couple high-frequency oscillator 20 to vertical deflection coil 83 and to couple mixer 34 to horizontal deflection coil 84. Thus, lines 59 and 60 coupling the power amplifiers 81 and 82 to the raster scan switch control 50 in FIG. 2 correspond to control line 58 of FIG. 1.

The image display 80 of FIG. 2 further comprises an intensity control 85 drivenly coupled to the video signal differentiator 91 of the means 90 for enhancing the edges of the displayed images, the intensity control 85 serving to enhance the intensity of image edges, whereby greater definition of these edges is achieved.

An alternate embodiment of the image display system of FIG. 1 is shown in FIG. 3, and in which mutually angled raster scans are switched at the frame rate.

Referring now, to FIG. 3, there is illustrated a block diagram of the image display system of FIG. 1 in which there is provided a periodic signal generator 30, raster scan control 50, image enhancing means 90 and image display 80, corresponding to like referenced elements of FIG. 1. In the frame rate switching embodiment of FIG. 3, subharmonic signal generator 30 comprises a synchronizer 32, a low frequency oscillator 31, an interlace step mixer 34, a square wave generator 33, a 2:1 divider 35 and a sign inverter 40, all constructed and arranged similarly as the like-referenced elements of FIG. 2.

However, the cooperation of the elements in FIG. 3 differs from that of the arrangement of FIG. 2, in that output line 41 of divider 35 is not fed to mixer 34 not is output line 38 of generator 33 fed to switch control 50 in the arrangement of FIG. 3; instead, output line 41 of divider 35 is fed as an input to switch control 50.

Since the square wave generator 33 in FIG. 3 is operated at the system field rate, the output of 2:1 divider 35 is at the frame rate for a system using a two field per frame scan technique. Thus, in normal operation of the embodiment of FIG. 3, deflection control signals will be applied to a given one of deflection coils 83 and 84, for two raster scan field sweeps prior to actuation of the raster scan switch control 50. Cooperation of square wave generator 33 and sign inverter 40 actuate raster scan switch control 50, causing a orthogonal shift of raster scan control signal to the other of deflection coils 83 and 84. The interlace step mixer 34 again provides an input to the raster scan switch control 50. Interlace is accomplished by spacing the sweep line signals on each deflection coil so that every other image display line is swept. For instance, in a familiar 525 line TV display, every other line of the image display is swept. On the last line scan, that is halfway through the scan of line number 525 (263rd actual line scan), a scan shift causes the scan to return to the top of the screen. The next field sweep is then displaced one image display line width from the prior sweep such that each line of the subsequent sweep falls between the lines of the prior sweep.

Details of the various circuit configurations of interlace step mixers which can be used in practicing this invention are not described. Such details are believed to be well known to those skilled in the art, as for example, switching after half the last line on an odd line sweep is completed to effect interlace on the next successive sweep.

Figure 4:
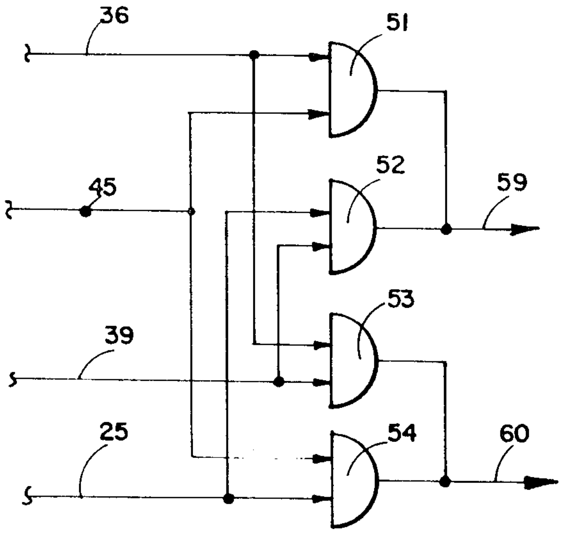
FIG. 4 is a block diagram in fuller detail of an electronic raster scan switching control suitable for switching the image system raster scan of the present invention.

FIG. 4 depicts one embodiment of an electronic raster scan switch control 50 utilizing AND gate circuitry for scan switching at a preselected one of the field rate and the frame rate. There are provided four AND-gates 51, 52, 53, and 54; AND-gates 51 and 53 being commonly responsively coupled to interlace mixer output line 36 and AND-gates 52 and 54 being commonly responsively coupled to high frequency output line 25. AND-gates 52 and 53 are further responsively coupled to inverter output line 39, and AND-gates 51 and 54 are further responsively coupled to output terminal 45.

The outputs of AND-gates 51 and 52 are commonly coupled to input line 59 (of power amplifier 81) and in a similar manner AND-gates 53 and 54 are similarly commonly coupled to input line 60 (of power amplifier 82). Of course, the common output coupling of AND-gates 51 and 52 could be reversed with that of AND-gates 53 and 54.

In FIG. 4, an input may be applied to terminal 45 from either the output from the square wave generator 38 (per FIG. 2) or the output from the 2:1 divider 41 (per FIG. 3), depending on whether raster scan switching is to occur at the field rate or the frame rate respectively.

Figure 5:
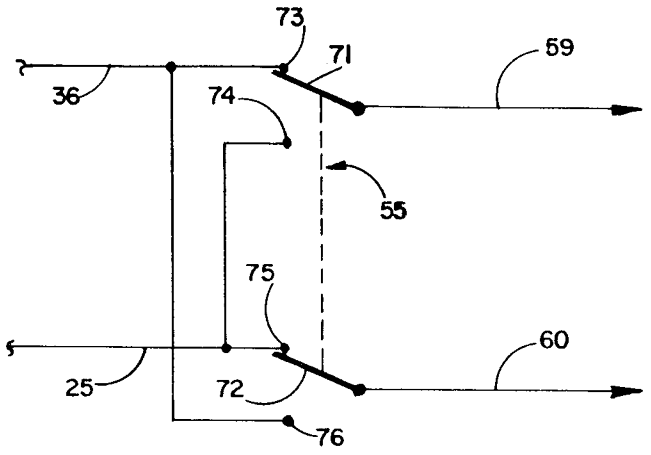
FIG. 5 is a schematic of the electromechanical equivalent of the electronic raster scan switching control of FIG. 4.

FIG. 5 is illustrative of the electromechanical equivalent of the raster scan switch control 50, similar numerical notation being used to show input and output signals corresponding to FIG. 4. A further description of the construction of a double-pole double-throw electronic switch may be found in U.S. Pat. No. 3,424,990 issued to A. E. Escobosa for Synchronous Demodulating Means. In a first switched state of the arrangement of FIG. 5, ganged contact 55 simultaneously engages armatures 71 and 72 with contacts 73 and 75 respectively, to connect line 59 to the interlace step mixer output on line 36, and connect line 60 to the high-frequency output on line 25. In a second switched state, contacts 74 and 76 respectively operate to interconnect lines 59 and 25 and also interconnect lines 60 and 36. Thus, outputs 59 and 60 are alternately connected to mutually exclusive ones of input lines 25 and 36 in response to alternate switching states of the two-state switch.

The switching rate of the switch may be either at the field rate or the frame rate. In actual practice, electronic switching is more commonly used because of the relatively high switching rates involved in a scanned image system. Mechanical switching may be useful in applications involving slower switching rates responsive to the motions, for instance, of specified apparatus of the system.

FIGS. 6*a* through 6*g* graphically depict the time relationship of the various responses the scanned image display system of FIG. 2, for an exemplary *525* line image display switching at the field rate, where the field rate is half the frame rate.

Figure 6A:
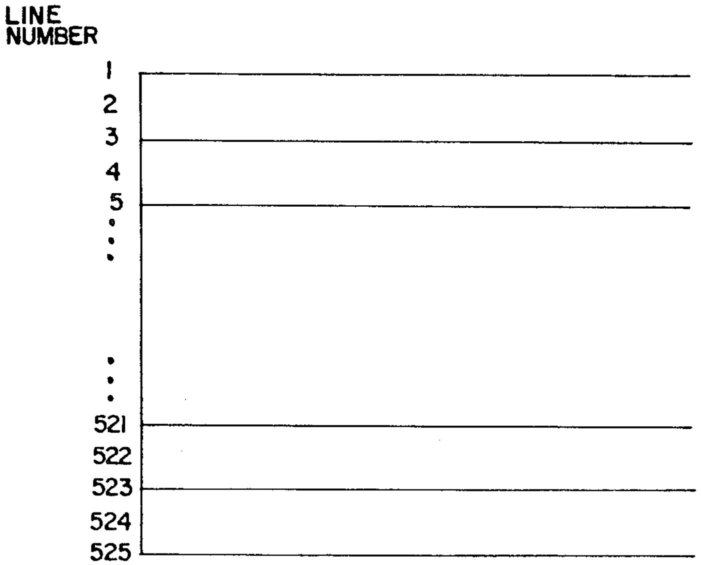
Figure 6B:
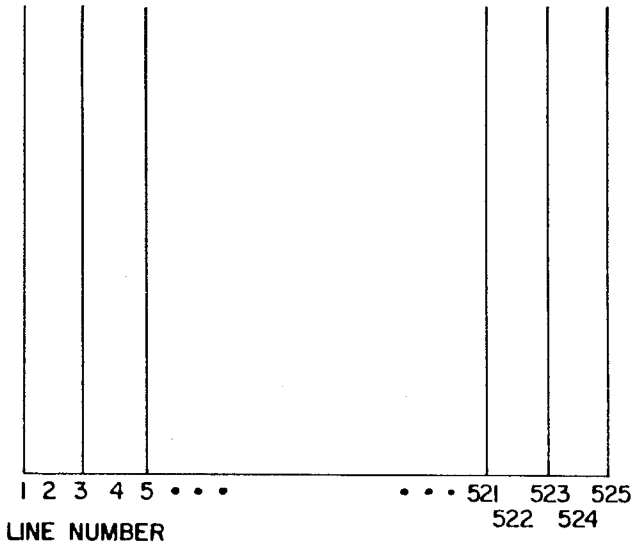

FIG. 6*a* illustrates the horizontal scan sweeps every other line of the image display in the horizontal direction. When the horizontal field sweep is completed, the raster orientation is switched to vertical and a field sweep as shown by FIG. 6*b* of every other line of the image display in the vertical orientation. FIG. 6*e* represents the composite of the sweeps of FIGS. 6*a* and *b*.

Figure 6C:
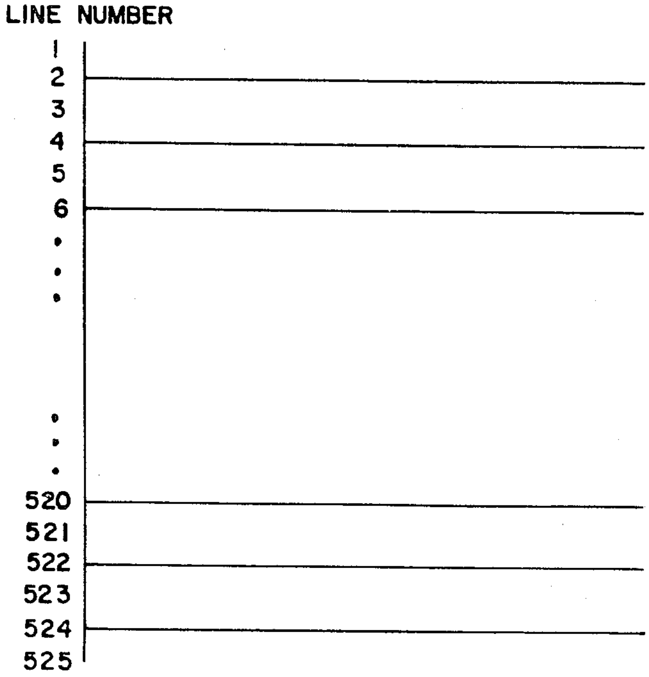

Upon completion of the vertical field sweep of FIG. 6*b*, the raster orientation is again switched to the horizontal direction and a horizontal sweep as depicted in FIG. 6*c* is made of all lines not swept on the prior horizontal sweep. In other words, the image display lines of FIG. 6*c* occur spatially between the lines of the prior horizontal sweep (FIG. 6*a*). FIG. 6*f* is the composite of the sweeps of FIGS. 6*a*, 6*b* and 6*c;* the scans of 6*a* and 6*c* are, it will be noted, interlaced.

Figure 6D:
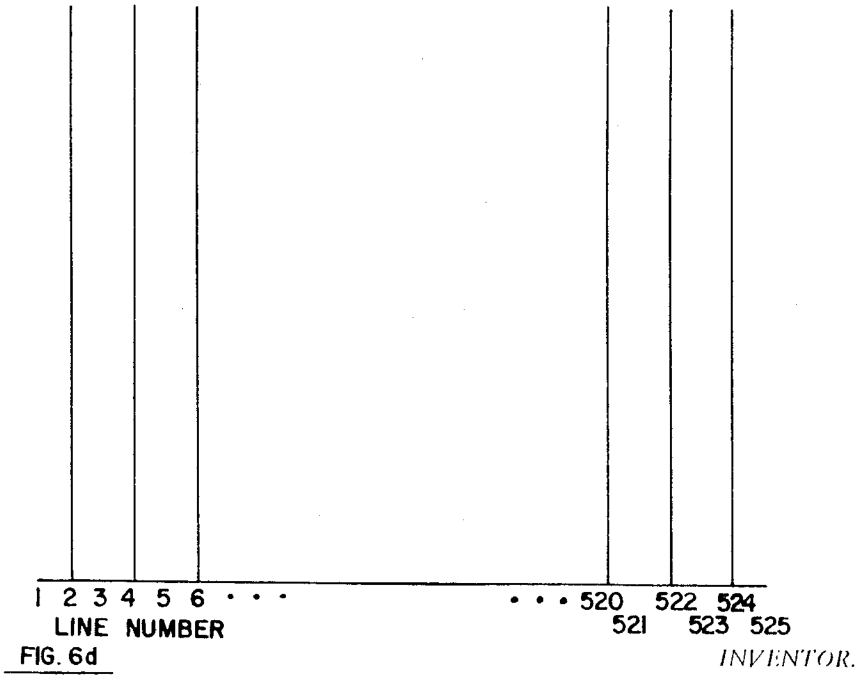
Figure 6E:
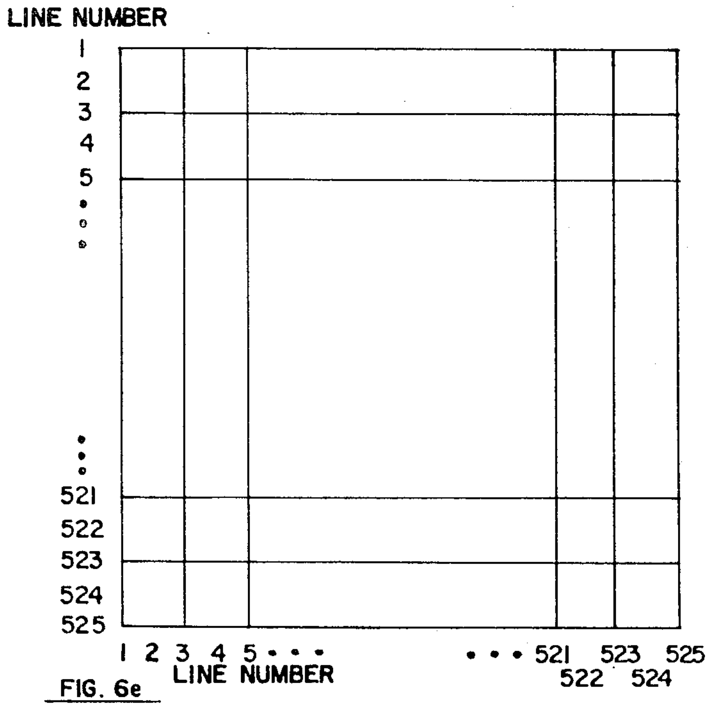
Figure 6F:
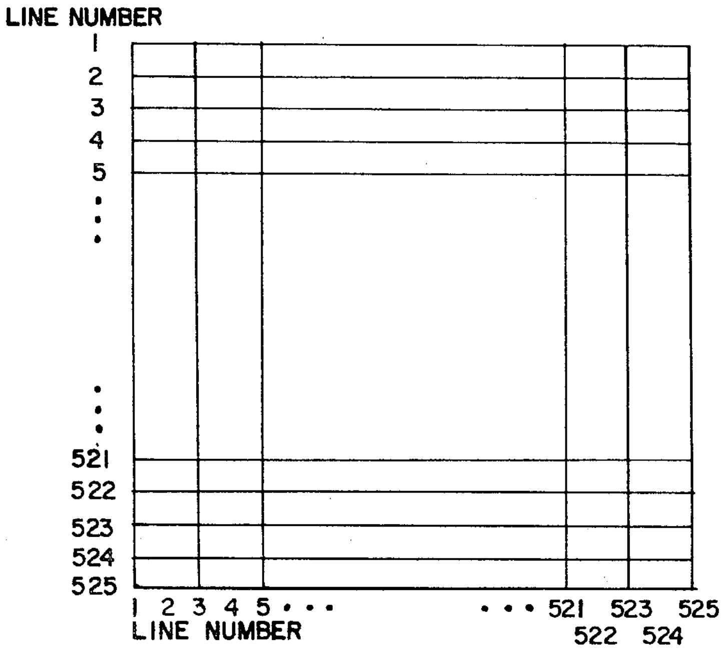

FIG. 6*d* represents the next successive sweep in the vertical direction of image lines not swept on the prior vertical field sweep. The field sweep of FIG. 6*b* follows completion of the horizontal field sweep of FIG. 6*c*, and the sequence would continue with a repeat of the sweep of 6*a* followed by 6*b*, etc. as noted above.

Figure 6G:
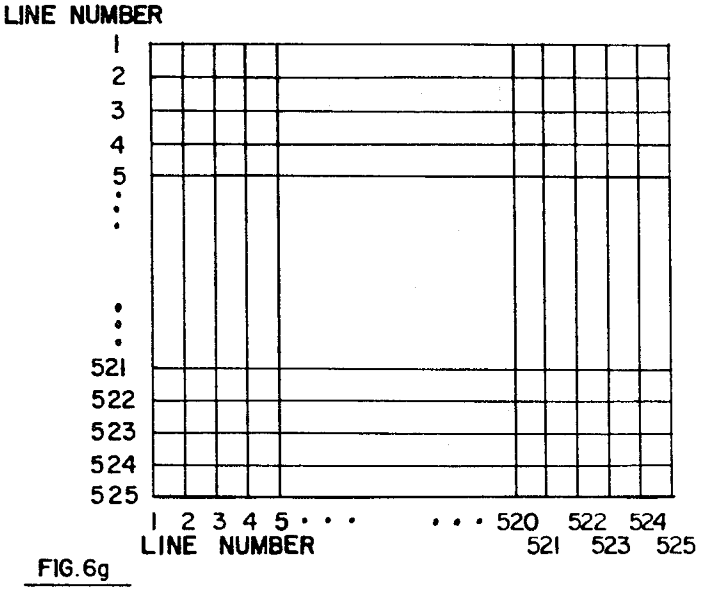

The composite image of FIG. 6*g* represents the four field sweeps of FIGS. 6*a*, 6*b*, 6*c* and 6*d* (two each in the horizontal and vertical directions) comprising two frames. Interlace of both the horizontal and vertical sweeps has been effected and, of course, enhancement of the edges of the display image utilizing second derivative subtraction to the original video signal which is an analog of brightness change taking place perpendicular to the raster scan has been effected on all sweeps.

FIGS. 7*a* through 7*g* graphically depict the time relationship of the various responses of the scanned image display system, of FIG. 3, for an exemplary 525 line image display switching at the frame rate, where the frame rate is twice the field rate.

Figure 7A:
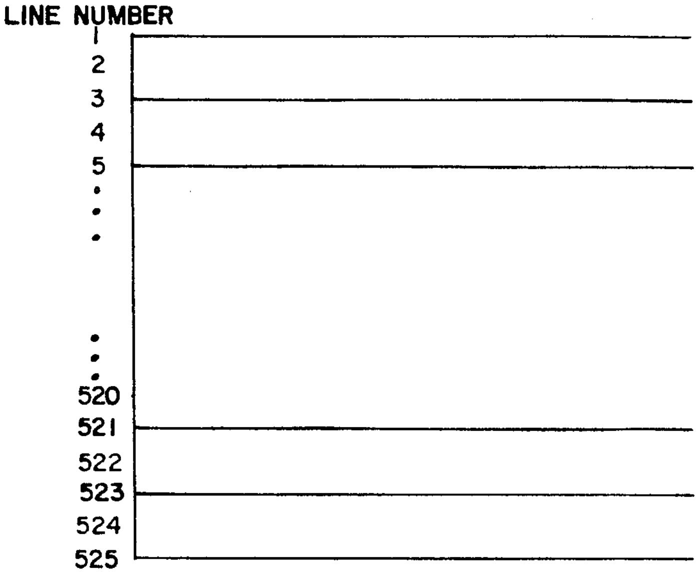
Figure 7B:
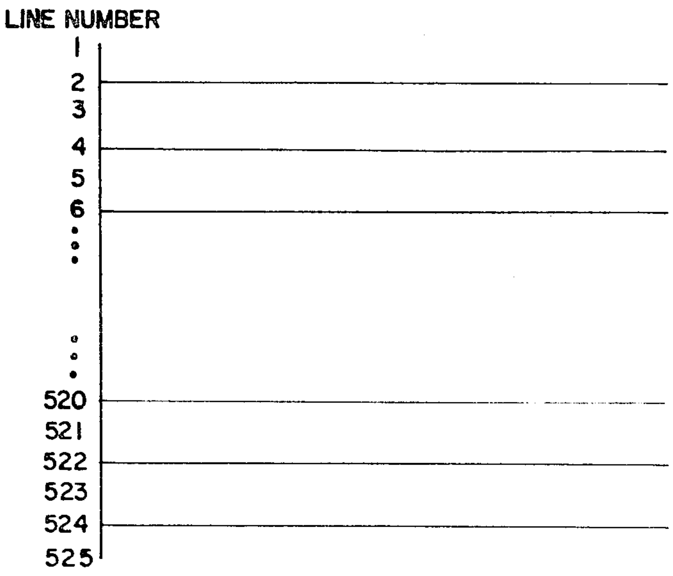

In FIG. 7*a* the horizontal scan sweeps every other line of the image display in the horizontal direction. When the horizontal field sweep is completed the raster scan, as shown by FIG. 7*b*, returns to the top of the image display and sweeps all the image lines not swept on the immediately prior (FIG. 7*a*) horizontal sweep. FIG. 7*e* represents the composite of the sweeps of FIGS. 7*a* and 7*b*; the scans of 7*a* and 7*b* are, it will be noted, interlaced.

Figure 7C:
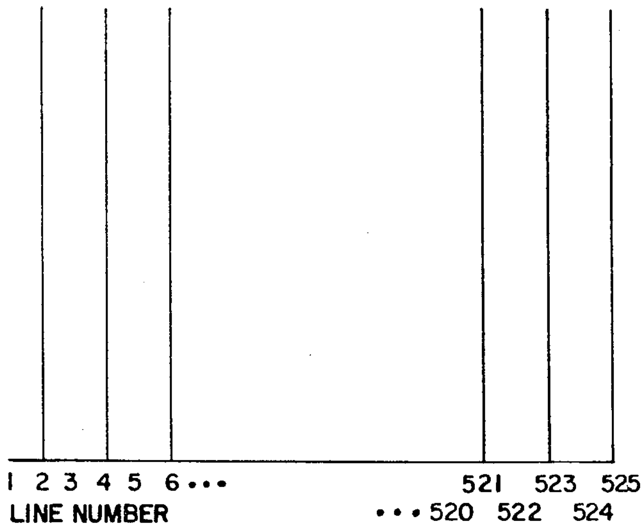

Upon completion of the horizontal sweep of FIG. 7*b*, one frame having been swept, the raster orientation is switched to the vertical direction, and a sweep of every other line of the image display in the vertical direction is made as shown by FIG. 7*c*. FIG. 7*f* is the composite of the sweeps of FIGS. 7*a*, 7*b*, and 7*c*.

Figure 7D:
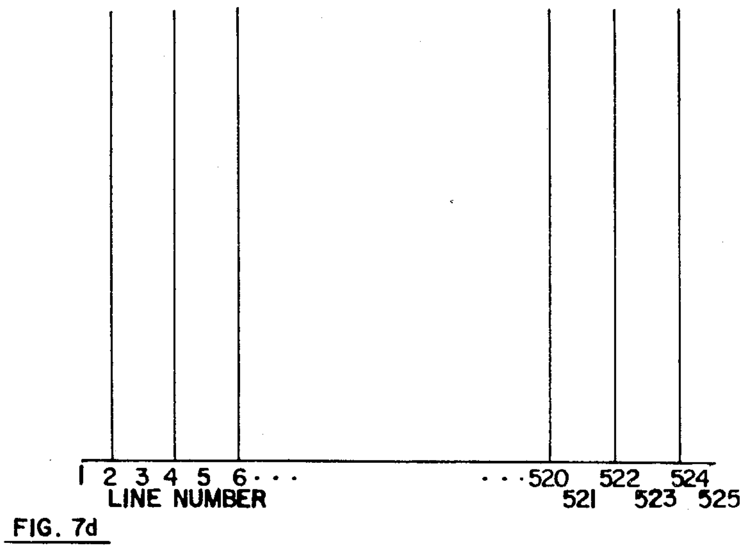
Figure 7E:
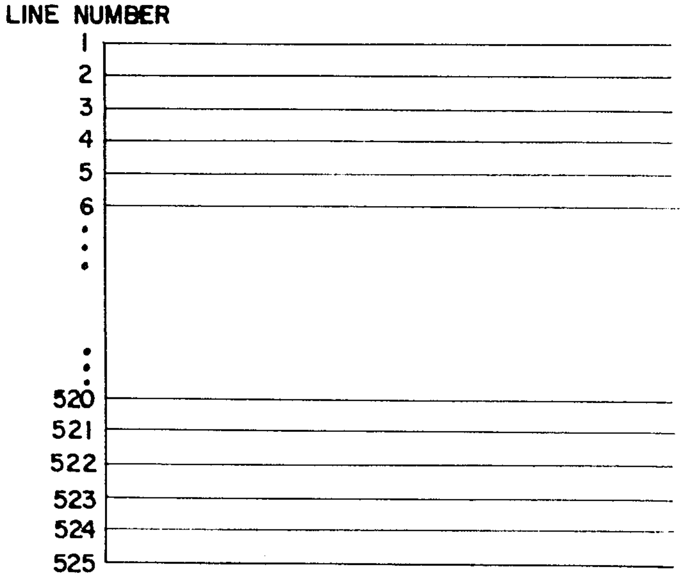
Figure 7F:
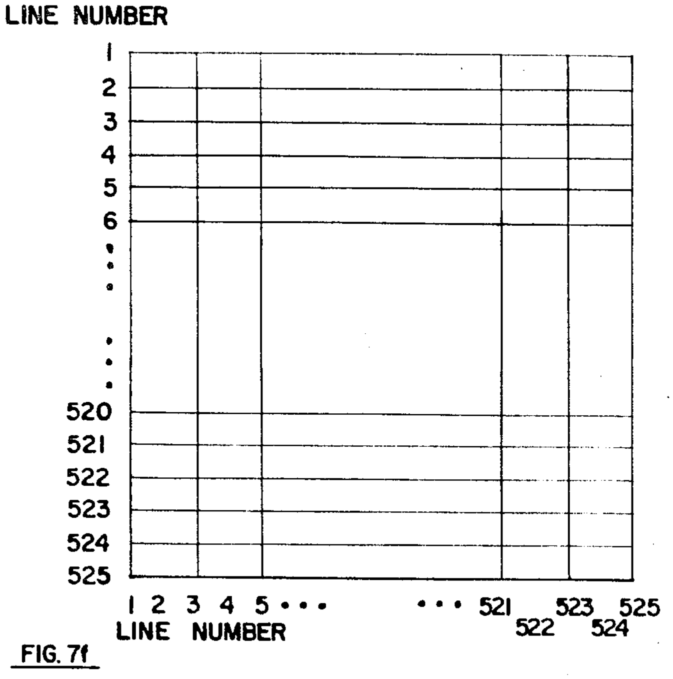

FIG. 7*d* represents the next successive sweep in the vertical direction of image lines not swept on the prior vertical field sweep of FIG. 7*c*.

Figure 7G:
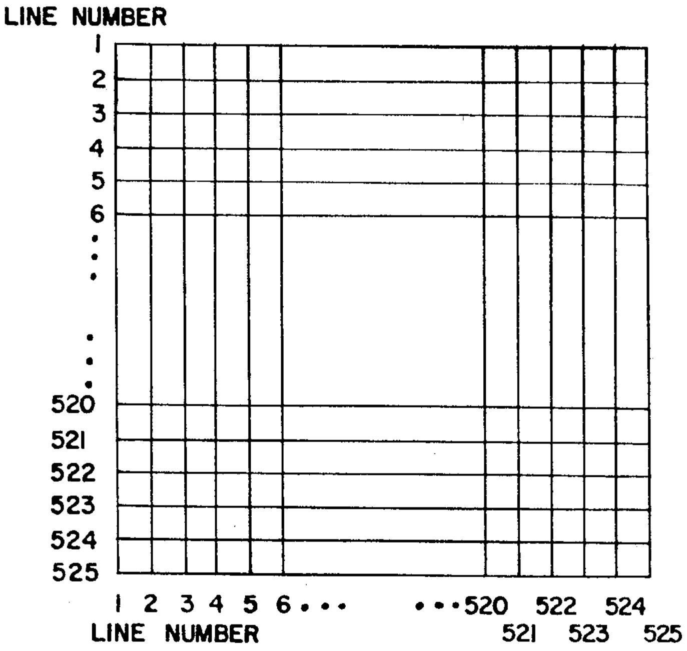

After the sweep of 7*d* is completed, the raster scan would be reoriented to the horizontal direction and the above described sequence continued. The composite image of FIG. 7*g* represents the four described field sweeps of FIGS. 7*a*, 7*b*, 7*c* and 7*d* (two each in the horizontal and vertical directions) comprising two frames. Interlace has been effected on both the horizontal and vertical sweeps, however, only one raster reorientation switching was required to complete the two frame sweeps, as opposed to three raster reorientation switchings to complete the two frame sweeps when switching at the field rate (as shown in FIGS. 6*a* through 6*g* for the arrangement of FIG. 2). Of course, enhancement of the edges of the display image has taken place on all sweeps.

It will be noted that the resultant composite sweeps illustrated in each of FIGS. 6*g* and 7*g* are identical for switching at the field rate (in FIG. 2) and the frame rate (in FIG. 3). In theory, the results from switching at the field rate and the frame rate are identical, but in practice slightly increased flicker is observed when switching at the frame rate.

Accordingly, there has been described a novel edge sharpening scheme for television images of unusual utility in sharpening image edges regardless of their separate orientations.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an image display system responsive to a periodic video signal and having switchable raster scan, means for enhancing the edges of a display image and comprising first periodic signalling means for generating a raster scan rate;

second periodic signalling means responsive to said first periodic signalling means for generating an output in synchronism with and at a subharmonic of said first periodic signalling means corresponding to a raster scan period;

control means responsive to said first and second periodic signalling means for control of said scan means in an alternative one of mutually perpendicular raster scan directions and comprising switchable horizontal and vertical deflection control means for effecting a raster scan at a preselected field rate and frame rate, and switching means responsive to said first and second periodic signalling means for effecting an alternately horizontal and vertical mode of said raster scan;

video signal differentiator means interposed in series with an output of said periodic video signal source;

a first, second, third and fourth AND gates and a third periodic signal source;

said first and third AND gates being commonly responsively coupled to said second periodic signalling means, said second and fourth AND gates being commonly responsively coupled to said first periodic signalling means, said first and fourth AND gates being further commonly responsive to a first one of two states of said third periodic signalling means, said second and third AND gates being further commonly responsive to a second one of said two states of said third periodic signalling means; and one of said horizontal and vertical deflection control means being responsively coupled to the outputs of said first and second AND gates, and the other of said deflection control means being responsively coupled to the outputs of said third and fourth AND gates.

2. An image display system responsive to a periodic video signal source comprising in combination:

a high-frequency oscillator;

a controllable low-frequency oscillator operating at the field rate of said image display system;

a synchronizer responsively coupled to an output of said high-frequency oscillator, an output of said synchronizer coupled to control low frequency oscillator in synchronism with a preselected subharmonic of said high-frequency oscillator;

a two-state signal generator responsively coupled to said synchronizer output;

interlace mixer means responsively coupled to said low-frequency oscillator output for interlacing the lines of consecutive field scans in like directions;

a 2:1 frequency divider having an input coupled to the output of said two-state signal generator and further having an output coupled to an input of said interlace mixer means, whereby interlace will occur between every other line of said image display;

controllable double pole, double-throw switching means for alternately switching the respective outputs of said interlace step mixer means and said high-frequency oscillator between mutually exclusive ones of first and second scanning means for scanning in two mutually exclusive directions; and video signal differentiator means interposed in series with an output of said periodic signal source.

3. The image display system according to claim 2 and wherein said mutual exclusive scanning directions are orthogonal.

4. The image display system according to claim 2 and further comprising a sign inverter having an input coupled to an output of said two-state signal generator and further having an output which is the digital NOT function of said square wave generator for control of said switching means.

5. The image display system according to claim 2 and wherein said switching means further comprises:

first, second, third and fourth AND gates;

an input of each of said first and third AND gates commonly responsively coupled to the output of said interlace step mixer;

an input of each of said second and fourth AND gates commonly responsively coupled to the output of said high-frequency oscillator;

an input of each of said first and second AND gates commonly responsively coupled to the output of said 2:1 frequency divider;

an input of each of said third and fourth AND gates commonly responsively coupled to the NOT function of said 2:1 frequency divider.

6. The image display system according to claim 5 and wherein:

an output of each of said first and second AND gates is commonly connected as an input to one of said first and second scanning means;

an output of each of said third and fourth AND gates are commonly connected as an input to the other of said scanning means.

* * * * *